(12) United States Patent
Heinz

(10) Patent No.: US 11,886,027 B2
(45) Date of Patent: Jan. 30, 2024

(54) FLAME RETARDANT COMPOUND ON CABLE CENTRAL MEMBER

(71) Applicant: Corning Optical Communications LLC, Charlotte, NC (US)

(72) Inventor: Michael Alexander Heinz, Berlin (DE)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/880,188

(22) Filed: May 21, 2020

(65) Prior Publication Data

US 2020/0301087 A1    Sep. 24, 2020

Related U.S. Application Data

(63) Continuation of application No. PCT/US2018/061537, filed on Nov. 16, 2018.

(60) Provisional application No. 62/592,919, filed on Nov. 30, 2017.

(51) Int. Cl.
*G02B 6/44* (2006.01)

(52) U.S. Cl.
CPC .......... *G02B 6/4436* (2013.01); *G02B 6/448* (2013.01); *G02B 6/4434* (2013.01); *G02B 6/4486* (2013.01)

(58) Field of Classification Search
CPC .................................................. G02B 6/4436
See application file for complete search history.

(56) References Cited

U.S. PATENT DOCUMENTS

| | | | |
|---|---|---|---|
| 5,230,034 A * | 7/1993 | Bottoms, Jr. | G02B 6/4419 385/100 |
| 7,346,244 B2 | 3/2008 | Gowan et al. | |
| 10,678,009 B2 | 6/2020 | Gallo et al. | |
| 10,725,257 B2 | 7/2020 | Lipiec et al. | |
| 11,079,561 B2 * | 8/2021 | Hudson, II et al. | G02B 6/4436 |
| 2014/0254994 A1 * | 9/2014 | Cho | H01B 7/328 385/101 |

(Continued)

FOREIGN PATENT DOCUMENTS

| | | |
|---|---|---|
| EP | 261675 A2 | 3/1988 |
| JP | 59111107 A | 6/1984 |

(Continued)

OTHER PUBLICATIONS

International Search Report and Written Opinion of the International Searching Authority; PCT/US2018/061537; dated Apr. 2, 2019; 15 Pages; European Patent Office.

*Primary Examiner* — Charlie Y Peng
(74) *Attorney, Agent, or Firm* — William D. Doyle

(57) ABSTRACT

An optical fiber cable includes a central strength member, a bedding compound surrounding the central strength member, a plurality of buffer tubes stranded around the central strength member and the bedding compound such that the bedding compound forms to the buffer tubes and occupies substantially the entirety of an inner core area between the buffer tubes and the central strength member. At least one of the buffer tubes contains a plurality of optical fibers and a jacket surrounds the plurality of buffer tubes. The cable may further include a second bedding compound that fills interstices in an outer core area between the buffer tubes and the jacket.

22 Claims, 2 Drawing Sheets

(56) References Cited

U.S. PATENT DOCUMENTS

| | | | |
|---|---|---|---|
| 2015/0071594 A1* | 3/2015 | Register, III | G02B 6/4429 |
| | | | 385/101 |
| 2015/0268430 A1* | 9/2015 | Bringuier | G02B 6/443 |
| | | | 385/113 |
| 2015/0346445 A1* | 12/2015 | Blazer | G02B 6/4433 |
| | | | 385/114 |

FOREIGN PATENT DOCUMENTS

| | | | | |
|---|---|---|---|---|
| WO | WO-02057359 A1 * | 7/2002 | | C08L 23/0815 |
| WO | WO-2012073260 A1 * | 6/2012 | | G01D 5/35358 |
| WO | WO-2016205316 A1 * | 12/2016 | | G02B 6/4486 |
| WO | 2018/013396 A1 | 1/2018 | | |

\* cited by examiner

FLAME RETARDANT COMPOUND ON CABLE CENTRAL MEMBER

CROSS-REFERENCE TO RELATED APPLICATIONS

This application is a continuation application of International Application Number PCT/US2018/061537, filed Nov. 16, 2018, which claims priority to U.S. Patent Application No. 62/592,919, filed Nov. 30, 2017, the disclosure of each of which is incorporated herein by reference in its entirety.

BACKGROUND

Referring to FIG. 1, an optical communication cable, shown as cable 10, includes a cable body, shown as cable jacket 12, having an inner surface that defines an internal area or region within which the various cable components discussed below are located. Generally, a plurality of optical fibers 14 is included among the cable components, and the cable 10 provides structure and protection to a plurality of optical fibers 14 during and after installation (e.g., protection during handling, protection from elements, protection from vermin, etc.).

As shown in FIG. 1, the cable 10 includes a plurality of buffer tubes 16 wound in a pattern or arrangement (e.g., a spiral pattern, a helical pattern, SZ pattern, etc.) around a central support member, shown as central strength member 20. The buffer tubes 16 house the optical fibers 14, which may be loose fibers, intermittently connected groups of fibers, or optical fiber ribbons, for example. The central strength member may be formed from a material such as glass fiber reinforced plastic (GRP) or metal (e.g., steel). The buffer tubes 16 surround the central member 20 and may be up jacketed with an up jacket layer 22 to achieve a certain thickness for stabilization against shrink forces New regulations, such as the Construction Product Regulation (CPR) in Europe, require improved flame retardant properties for optical fiber cables. To improve burn characteristics of the cables, such as a measurement of total heat release rate and smoke density during burning, all components of the cable have to be looked at for optimization. For example, the jacket 12 may be a halogen free flame retardant sheath. In addition, as also shown in FIG. 1, a high flame retardant bedding compound 30 may be used to fill an outer core area 32 comprising the gaps and interstices between the buffer tubes 16 and the jacket 12. The usage of a bedding compound improves significantly the flame retardant properties of a cable. Bedding compounds are typically a relatively soft material with very low or nearly no mechanical strength. The flame retardant additive content (active or passive mineral filler) goes up to 80% with 20% of very soft polymer that works as a binder to ensure the shape of the produced geometry.

However, the up jacket layer 22 is typically comprised of Polyethylene (PE), which is a combustible material. Moreover, as shown in FIG. 1, there is typically free space in the interstices 32 of an inner core area between the up jacketed central member 20 and the buffer tubes 20. As such, a flame can travel unhindered through the interstices 32, which work as a chimney to potentially accelerate the heat and flame distribution within the cable 10. To improve the burn characteristics of a cable such that shown in FIG. 1, there is a need to remove the up jacketed layer 22 on the central member 20 and fill the interstices 32 of the inner core area with a highly flame retardant compound.

SUMMARY

An optical fiber cable includes a central strength member, a bedding compound surrounding the central strength member, and a plurality of buffer tubes stranded around the central strength member and the bedding compound such that the bedding compound forms to the buffer tubes and occupies substantially the entirety of an inner core area between the buffer tubes and the central strength member. A jacket may be provided to surround the plurality of stranded buffer tubes.

A method of manufacturing an optical fiber cable includes extruding a bedding compound onto a central strength member and stranding buffer tubes around the central strength member such that the buffer tubes at least partially embed into the bedding compound while the bedding compound is in a molten state.

DETAILED DESCRIPTION

Figure 2:
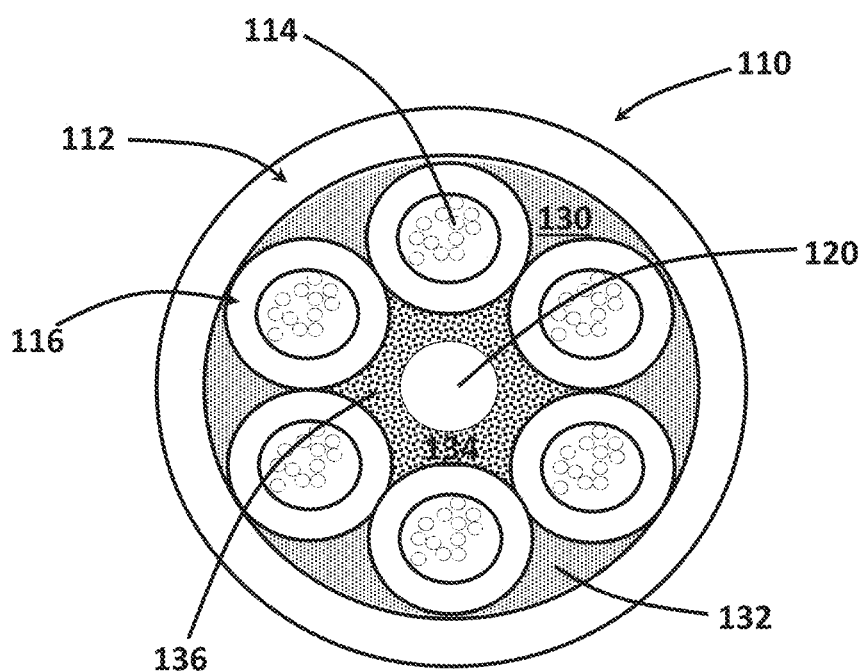
FIG. 2 is a cross-sectional view of a fiber optic cable in accordance with yet other aspects of the present disclosure.

FIG. 2 illustrates an optical fiber cable, shown as cable 110 that includes a cable body, shown as cable jacket 112, having an inner surface that defines an internal area or core region within which the various cable components discussed below are located. Generally, a plurality of optical fibers 114 is included among the cable components, and the cable 110 provides structure and protection to a plurality of optical fibers 114 during and after installation (e.g., protection during handling, protection from elements, protection from vermin, etc.). The optical fibers are preferably silica-based, single mode fibers, but they can be any type of optical fiber including, for example, a multi-mode or dispersion shifted optical fibers. The optical fibers 114 may be intermittently or continuously connected with a UV curable matrix, for example, to be rollable or standard optical fiber ribbons.

As shown in FIG. 2, the cable 110 includes a plurality of buffer tubes 116 wound in a pattern or arrangement (e.g., a spiral pattern, a helical pattern, SZ pattern, etc.) around a central support member, shown as central strength member 120. The buffer tubes 116 house the optical fibers 114, which may be loose fibers, intermittently connected groups of fibers, or optical fiber ribbons, for example. The central strength member 120 may be formed from a material such as glass fiber reinforced plastic (GRP) or metal (e.g., steel). The buffer tubes 116 surround the central member 120. The buffer tubes may be provided with at least one water-blocking substance, such as gel, grease, or a super-absorbent polymer powder.

The jacket 112 may be a halogen free flame retardant sheath. In addition, as also shown in FIG. 2, a high flame retardant bedding compound 130 may be used to fill an outer core region 132 comprising the gaps and interstices between the buffer tubes 116 and the jacket 112. The usage of a bedding compound improves significantly the flame retardant properties of a cable. Bedding compounds are typically a relatively soft material with very low or nearly no mechanical strength. The flame retardant additive content (active or passive mineral filler) goes up to 80% with 20% of very soft polymer that works as a binder to ensure the shape of the produced geometry.

As shown in FIG. 2 however, the up jacket layer 22 of FIG. 2 is removed, as is the combustible presence of the PE material that typically comprises the up-jacket layer. As also shown in FIG. 2, a second bedding compound 134 may be applied during extrusion and used to fill the free space in the interstices of an inner core area 136 between the central member 120 and the buffer tubes 116. The bedding compound 134 may be applied before or as the buffer tubes 120 are being stranded about the central strength member 120. Accordingly, the bedding compound 134 will provide certain softness during the manufacturing process to allow the buffer tubes 116 to be pressed into the bedding compound 132 and fill all interstices of the inner core area 136.

Figure 1:
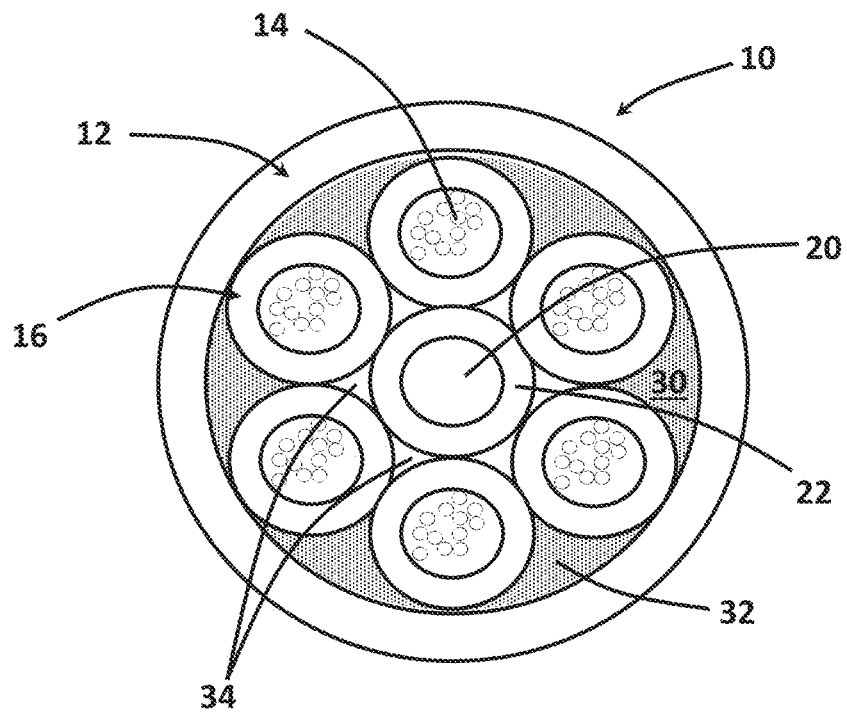
FIG. 1 is a cross-sectional view of a fiber optic cable in accordance with aspects of the present disclosure.

An active flame retardant effect is thus brought into an area where no flame retardancy conventionally exists and the flammable PE of the up jacket layer may be replaced. The chimney effect discussed with respect to FIG. 1 is prevented and the additional flame retardant materials reduce heat transfer and flame spread. The buffer tubes 116 are effectively bedded on the central member 120 and stabilized (from the center of the cable and between each other), which improves crush resistance. In addition, the bedding works as a stabilizing filler along the cable by increasing the contact area between central member 120 and the buffer tubes 116 which increases friction in the case of thermal contraction. The bedding materials can be chosen to avoid sticking to the buffer tubes 116 for installation and a suitable production process (e.g., coilable types, hardness, filler amount).

Table 1 below illustrates the impact of the bedding compound on the flame retardant characteristics of the cable 110 shown in FIG. 2. Two samples of a conventional PE up-jacket layer are compared to two bedding compounds. As illustrated, Sample A and Sample B of the up-jacket layer have significantly lower limiting oxygen index (LOI) and significantly higher peak heat release rates. As shown, the two bedding compound samples, Sample C and Sample D, have an LOI of 65% or higher and peak heat release rate 144 $kW/m^2$ or lower.

TABLE 1

| Material | Limited oxygen index (the higher, the better) | peak heat release rate ($kW/m^2$) (the lower the better) | Price €/kg |
|---|---|---|---|
| Sample A-Up-jacket | 40% | 234 | 1.88 |
| Sample B-Up-jacket | 35% | 360 | 1.98 |
| Sample C-Bedding compound 1 (FM 474/5) | 65% | 42 | 1.26 |
| Sample D-Bedding compound 2 (FM 361) | 80% | 144 | 1.11 |

An additional bonus for the cable manufacturer is that the bedding compounds typically cost substantially less than comparative amounts of the PE up jacket material, as also shown in Table 1.

The percentage weight of a cable that is comprised by the up jacket layer is typically between 10-20% for many types of indoor optical fiber cables. Accordingly, the replacement of materials such as the up jacket layer can have a huge impact on price and burn performance of the cable.

Figure 3:
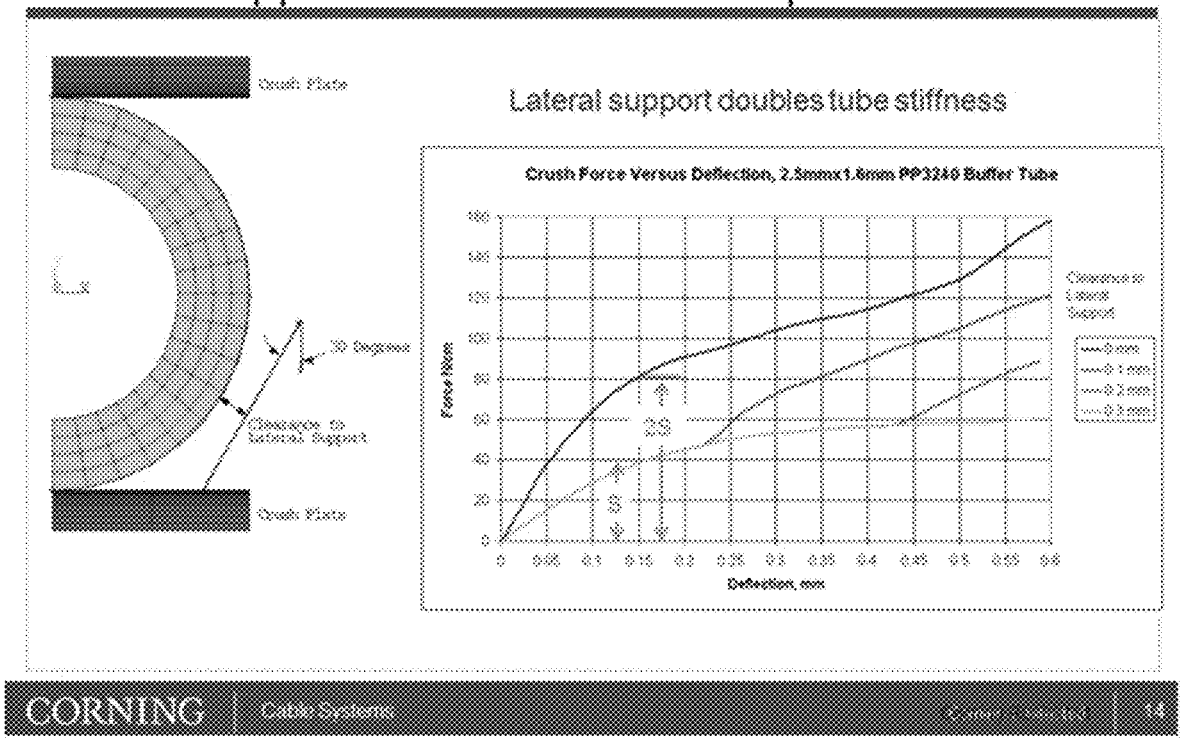
FIG. 3 is a chart illustrating the impact of lateral support on a buffer tube's stiffness.

The lower melting temperature of the bedding materials disclosed herein results in a level of softness in the material at relative low processing temperatures (50-100° C.), which allows for the buffer tubes 116 to be pressed into the bedding 134 to fill the inner interstices of the inner core area 136. By cooling to room temperature, the modulus of the bedding 134 increases significantly and creates a supporting structure in the inside. As shown in the chart in FIG. 3, the lateral support created by the supporting structure in the core of the cable may double the tube stiffness and thus the crush resistance of the cable 110.

The bedding compound 134 should be in a soft state during the stranding step of manufacturing the cable 110 (i.e., where the buffer tubes 116 are stranded around the central strength member 120). The bedding material should consist of polymeric materials with a relative low melting temperature to produce a soft, gel-like behavior during processing at temperatures of approx. 100° C., for example.

To apply the bedding into the construction of the cable, the processing methods can be divided into 2 types. First, the bedding compound 134 may be applied by direct extrusion shortly onto the central member 120 shortly before stranding. The buffer tubes 116 may then be stranded directly onto the central member while the bedding compound 134 is still in a substantially molten state.

A second method is to use a coilable bedding compound that is coiled on a drum and applied to the central strength member 120 in a separate processing step. During stranding, heat is subsequently applied to the central member 120 (e.g., hot air blower) to soften the bedding layer before the buffer tubes 120 are pressed into the bedding compound 134.

To estimate the bedding materials mechanical resistance at certain temperature in the stranding step, compression tests were performed. A 100 mm piece of buffer tube with 2.5 mm diameter and 3.3 mm diameter were pressed into plates of bedding compound at different temperatures. Assuming a maximum penetration of ⅓ tube diameter into the bedding and a coupling length of 10 mm within the stranding process, the following forces were measured at each of the processing temperatures shown:

| Temperature | tube (3.3 mm) | tube (2.5 mm) |
|---|---|---|
| 23° C. | 17.8N | — |
| 50° C. | 11.3N | 5.3N |
| 60° C. | 8.7N | 4.8N |
| 70° C. | 4.1N | 3.5N |
| 80° C. | 4.0N | 3.3N |
| 90° C. | 3.8N | 3.3N |
| 100° C. | 3.7N | 3.0N |

The relative low forces exhibited at processing temperatures above 60° C. do not damage the buffer tubes and may be realized by either a die the strand runs through, tension of the buffer tubes in the stranding process, or tension of yarns that run on top of the tubes.

It is to be understood that the foregoing description is exemplary only and is intended to provide an overview for the understanding of the nature and character of the features which are defined by the claims. The accompanying drawings are included to provide a further understanding of the embodiments and are incorporated and constitute part of this specification. The drawings illustrate various features and embodiments which, together with their description, serve to explain the principals and operation. It will become apparent to those skilled in the art that various modifications to the embodiments as described herein can be made without departing from the spirit or scope of the appended claims.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
   a central strength member;
   a bedding compound surrounding the central strength member;
   a plurality of buffer tubes stranded around the central strength member and the bedding compound such that the bedding compound forms to the buffer tubes and defines a continuous layer between the buffer tubes and the central strength member in an inner core area;
   a plurality of optical fibers inside at least one of the buffer tubes;
   a jacket surrounding the plurality of buffer tubes, the jacket being an outermost layer of the optical fiber cable; and
   a second bedding compound that fills interstices in an outer core area between the plurality of buffer tubes and the jacket.

2. The optical fiber cable of claim 1, wherein the bedding compound has a limiting oxygen index (LOI) of 65% or higher.

3. The optical fiber cable of claim 1, wherein the bedding compound has a peak heat release rate that is less than 144 kW/m$^2$.

4. The optical fiber cable of either claim 1, wherein the plurality of optical fibers are single-mode fibers.

5. The optical fiber cable of either claim 1, wherein the plurality of optical fibers comprises a stack of optical fiber ribbons.

6. The optical fiber cable of claim 5, wherein the optical fiber ribbons comprise an intermittent matrix material.

7. The optical fiber cable of claim 1, wherein the plurality of buffer tubes comprises six buffer tubes.

8. The optical fiber cable of claim 7, wherein the buffer tubes are stranded in an SZ pattern around the central strength member.

9. The optical fiber cable of claim 7, wherein the buffer tubes are helically stranded around the central strength member.

10. The optical fiber cable of claim 1, wherein the bedding compound is in contact with the central strength member and the plurality of buffer tubes in the inner core area and wherein the second bedding compound is in contact with the plurality of buffer tubes and the jacket in the outer core area.

11. The optical fiber cable of claim 1, wherein the central strength member consists of glass reinforced plastic or metal.

12. A method of manufacturing an optical fiber cable, the method comprising:
    extruding a bedding compound onto a central strength member;
    stranding buffer tubes around the central strength member such that the buffer tubes at least partially embed into the bedding compound while the bedding compound is in a molten state, wherein the bedding compound defines a continuous layer between the buffer tubes and the central strength member; and
    providing a second bedding compound that fills interstices in an outer core area between the buffer tubes and a jacket, the jacket being an outermost layer of the optical fiber cable.

13. The method of claim 12, wherein the bedding compound has a limiting oxygen index (LOI) of 65% or higher.

14. The method of claim 12, wherein the bedding compound has a peak heat release rate that is less than 144 kW/m$^2$.

15. The method of claim 12, wherein the plurality of optical fibers are single-mode fibers.

16. The method of claim 12, wherein the plurality of optical fibers comprises a stack of optical fiber ribbons.

17. The method of claim 16, wherein the optical fiber ribbons comprise an intermittent matrix material.

18. The method of claim 12, wherein the plurality of buffer tubes comprises six buffer tubes.

19. The method of claim 12, wherein the step of stranding the buffer tubes includes stranding the buffer tubes in an SZ pattern around the central strength member.

20. The method of claim 12, wherein the step of stranding the buffer tubes includes helically stranding the buffer tubes around the central strength member.

21. The optical fiber cable of claim 12, wherein the second bedding compound is in contact with the plurality of buffer tubes and the jacket in the outer core area.

22. The optical fiber cable of claim 11, wherein the bedding compound is in contact with the glass reinforced plastic or metal.

* * * * *

UNITED STATES PATENT AND TRADEMARK OFFICE
CERTIFICATE OF CORRECTION

PATENT NO. : 11,886,027 B2
APPLICATION NO. : 16/880188
DATED : January 30, 2024
INVENTOR(S) : Michael Alexander Heinz It is certified that error appears in the above-identified patent and that said Letters Patent is hereby corrected as shown below:

In the Claims

In Column 5, Line 47, in Claim 4, after "of" delete "either".

In Column 5, Line 49, in Claim 5, after "of" delete "either".

Signed and Sealed this
Fourth Day of June, 2024

Katherine Kelly Vidal
*Director of the United States Patent and Trademark Office*